United States Patent
Fehr

[11] 3,943,391
[45] Mar. 9, 1976

[54] ELECTROMAGNETIC COUPLER HAVING AN ELECTROMAGNETIC WINDING

[75] Inventor: Henri Fehr, Montmorency, France

[73] Assignee: Sulzer Brothers Limited, Winterthur, Switzerland

[22] Filed: Oct. 11, 1973

[21] Appl. No.: 405,634

[30] Foreign Application Priority Data
Oct. 12, 1972 Switzerland.................. 14926/72

[52] U.S. Cl. ............... 310/103; 310/105; 336/177
[51] Int. Cl.² ....................................... H02K 49/00
[58] Field of Search......... 336/177; 310/45, 93–105, 310/208, 179, 180

[56] References Cited
UNITED STATES PATENTS

| | | | |
|---|---|---|---|
| 1,877,569 | 9/1932 | Falkenthal | 310/45 UX |
| 2,447,130 | 8/1948 | Matulaitis et al. | 310/105 X |
| 2,488,827 | 11/1949 | Pensabene | 310/105 |
| 2,583,124 | 1/1952 | Sampietro | 310/105 |
| 2,603,678 | 7/1952 | Helmer | 310/103 |
| 2,807,734 | 9/1957 | Lehde | 310/103 |
| 3,012,160 | 12/1961 | Sturzenegger | 310/105 |
| 3,047,754 | 7/1962 | Jaeschke | 310/105 |
| 3,230,405 | 1/1966 | Sorensen | 310/103 X |
| 3,247,476 | 4/1966 | Pintell | 336/177 |
| 3,283,188 | 11/1966 | Edick | 310/179 X |
| 3,417,271 | 12/1968 | Reed | 310/103 |
| 3,549,921 | 12/1970 | Halstead et al. | 310/105 |

*Primary Examiner*—Donovan F. Duggan
*Attorney, Agent, or Firm*—Kenyon & Kenyon Reilly Carr & Chapin

[57] ABSTRACT

The electromagnetic winding is made up of a plurality of insulated coils which are formed by a wound-up sheet metal strip. The strip is of a material having high magnetic permeability so that the coils eliminate the need for a magnetic core. The coils can be insulated from each other by a wound strip of insulating material such as paper or by means of a synthetic lacquer.

The electromagnetic coupler can be of the synchronous or asynchronous type and can be in the form of a clutch or brake.

7 Claims, 6 Drawing Figures

ELECTROMAGNETIC COUPLER HAVING AN ELECTROMAGNETIC WINDING

This invention relates to an electromagnetic coupler of the synchronous or asynchronous type having an electromagnetic winding and particularly a winding comprising a magnetic circuit and a conductor winding.

As is known, the conductive winding of a magnetic circuit normally consists of a coil having a certain number of windings of a wirelike or striplike material of high electrical conductivity. According to the principles of physics, a flow of electric current directly through the coil produces a magnetic field, whose magnetic lines run lengthwise in the interior of the coil and close outside the coil into a closed circuit. It is moreover well known that the magnetic field in the interior of the coil can be substantially strengthened by the introduction of a core of material which is highly permeable magnetically, e.g., a material such as soft iron. Also, it is known that the core can be extended at both ends via pole-shoes which are likewise highly permeable, so as to channel the magnetic flux outside the coil. This can be done either to obtain a close magnetic coupling to another coil, or else to obtain a great density of the magnetic flux in an air-gap whose form and dimensions are adapted to the function of the construction concerned.

In making excitation coils for known electromagnetic devices, use is made of metals which have good electrical conductivity and which are practically non-magnetizable, for example, copper, aluminum, silver, superconductive or other metals. The core and the pole-shoes are made of soft iron or some other metal which is magnetically highly permeable and are either made solid, for example, where the magnetic field is to be constant, or as a packet of laminations where an alternating flux is to be obtained and the losses resulting from Foucault currents can be kept small. In order to reduce loss currents still further, it is advantageous to use materials having a high specific electrical resistance. Generally, the cross-section of the core and pole-shoes are dimensioned relatively liberally, so as to obtain an optimum induced magnetic flux with a minimum of excitation ampere-coils.

However, in these previously known constructions, the cross-section and the volume of the magnetizable material, at least in the core zone of the magnetic circuit of the coupler, have been relatively large. As a result, the constructions have been relatively expensive.

Accordingly, it is an object of the invention to provide a conductive winding which is of compact inexpensive construction.

It is another object of the invention to provide an electromagnetic coil which utilizes a minimum of magnetic material.

Briefly, the invention provides an electromagnetic coupler of the synchronous or asynchronous type with a winding comprising a magnetic circuit and a conductor winding. The coupler has at least one rotor fastened on a rotatable shaft and an excitable magnetic circuit formed in part by the coupler housing. The circuit is excitable by means of the winding which is disposed concentrically of the rotor shaft. The circuit includes an air-gap in which a rotatable ring of stamped poles are carried by the rotor shaft. The conductor winding is made magnetizable in a lengthwise direction, at least in part, and consists of windings insulated from one another, laid flat over one another and made of magnetically highly permeable strip material, and in that the winding forms at least a part of the magnetizable coil core of the magnetic circuit of the coupler.

The winding is useful not only for the passage of the excitation current but also for passage of the magnetic flux. The winding is in the form of a disk, whose thickness approximately corresponds to the width of the flat strip out of which the winding is wound. The winding may, however, also be cylindrical, and on occasion with a polygonal cross-section, whereby the length of cylinder corresponds to the sheet metal strip width. As a whole the winding is of great magnetic permeability in its lengthwise direction, i.e., in the direction of the magnetic flux flow. In the radial direction, in which the permeability is impaired by the numerous insulating layers between the individual windings which act as air-gaps, and also in the peripheral direction in which the metal sheet is flowed through by the excitation current, the magnetic permeability plays no significant part.

Because the specific electrical resistance of the materials which usually have high magnetic permeability is relatively high, the magnetizable strip material, used for making the winding can be provided with a layer of material of high electrical conductivity. In this way, the specific performance of the winding can be increased or can be reduced for a given nominal output depending on the space-requirement of the coupler. In this case, it is particularly advantageous to make this highly-conductive layer of an anodically oxidized aluminum foil wherein the layer of oxide is thick enough to serve as an insulation between the superposed windings. Becuase the difference of potential between two successive windings is generally small, this kind of windings-insulation is adequate and saves much space.

Furthermore, in order to obtain an inner insulation of the coil of magnetizable sheetmetal strip, use may be made of any of the known processes and materials. The metal sheet may, for example, be coated on one or both sides with paper or adhesive foil, as is the case with the known sheetmetal for transformers; or else the sheetmetal may be covered with a well-adhering lacquer, preferably one which can be polymerized by the action of heat, so that the excitation winding may subsequently be baked to form, with all its parts, magnetizable or not, a strong self-supporting block.

The connecting wires for the magnetic winding of metal sheet may be connected to the sheet ends by welding or hard-soldering, or else in any other known way, as is for example usual in the fabrication of condensers.

For the outer windings of the winding, the inner magnetizable windings take over a part of the task falling to the usual magnetic core. Hence, these inner windings replace the core. On the other hand, the outer windings form, for the part of the operative flux induced by the inner windings, a bridging-over or magnetic shunting of the air-gap situated outside the coil. The core of the inner windings is formed by a solid piece of magnetically permeable material. The form of the magnetic path and the arrangement of the operative air-gap therefore plays a great part.

In order to decrease the short-circuiting or bridging-over of the outer coils on the flux induced by the inner coils, the electrically conductive winding is divided into a first inner part winding made of magnetizable strip or sheetmetal material, and a surrounding second outer part winding made in a known way by using a wire or strip of non-magnetizable material of high electric conductivity. The first part winding complements or replaces the magnetic core of the second part winding and thereby contributes to the closing of the magnetic circuit formed by the coupler housing and to exciting the second part winding. Such an arrangement permits a saving of bulk and weight in comparison with known forms of construction.

The magnetizable excitation winding may consist of an annular stator core installed in a stationary manner in the housing of a coupler or may be sub-divided into part-windings which are wound in the same direction and disposed ringwise, i.e., concentrically, over the periphery of a rotor. In each case, the coupler housing may form at least a part of the poles.

These and other objects and advantages of the invention will become more apparent from the following detailed description and appended claims taken in conjunction with the accompanying drawings in which:

In the different figures, analogous elements are given the same reference numerals.

Figure 1:
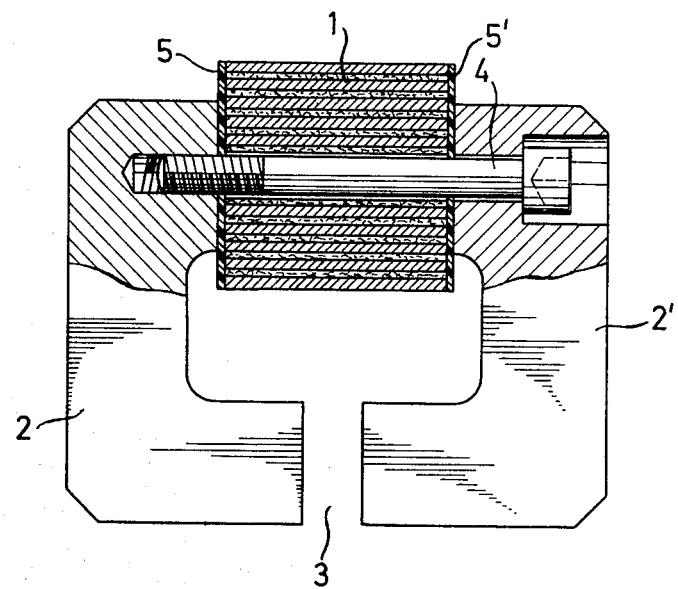
FIG. 1 illustrates a simplified schematic representation, partly in section, of an electromagnetic winding installed in a coupler according to the invention.

Referring to FIG. 1, a magnetizable cylindrical winding 1 consists of a number of windings of sheetmetal strip of highly permeable material, which are insulated in a known manner and are wound flat upon one another. In order to produce a magnetic circuit, the winding 1 carries two pole-shoes 2, 2', whose free ends delimit a main or operative air-gap 3 of the magnetic circuit. The winding 1 and the pole-shoes 2, 2', are held together by a screw 4 of magnetizable material which extends axially through the winding 1, and itself forms a part of the coil core. A supplementary insulating layer 5, 5', is inserted at each end of the winding 1 between the winding 1 and the associated pole-shoes 2, 2'. These insulating layers 5, 5' form, with respect to the magnetic circuit, two small secondary air-gaps whose influence is normally negligible but which, however, play a certain part when the main air-gap 3 of the magnetic flux offers only small resistance or when the air-gap is completely lacking.

As is familiar to every specialist, the pole-shoes 2, 2', are made of solid material, e.g., soft iron when used in an element for DC operations. In the case of an element for AC operation, they are made lamellar, e.g., of transformer sheetmetal or of a special alloy of especially high permeability, whereby the individual lamella are insulated from one another, as is known, to diminish losses through Foucault eddy currents.

Figure 2:
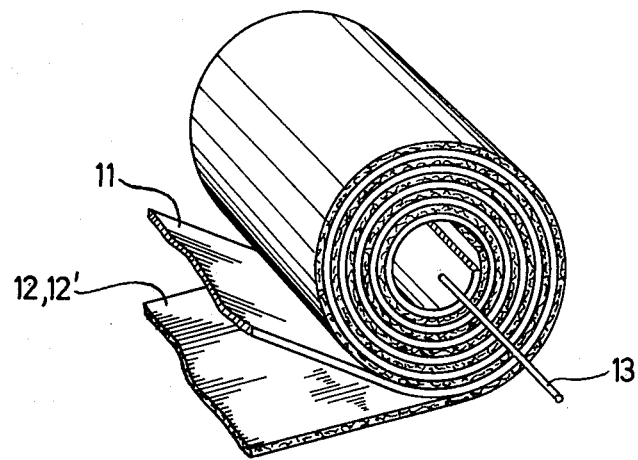
FIG. 2 illustrates a view of a winding consisting of various strip-materials according to the invention during fabrication.

As is shown in FIG. 2, the winding 1 consists of a sheetmetal strip 11, which may be kept thin and consists of a highly permeable material, e.g., of rolled-up transformer sheetmetal. The individual windings are wound flat over one another, and are insulated from one another in known manner. The insulation may be, for example, paper strip, a strip 12 of synthetic material, or some other suitable insulating material by which the sheetmetal strip 11 is covered. The insulation may also be a tightly-adhering coating of lacquer of the usual kind. In this case, use is preferably made of a polymerizable synthetic lacquer, which permits the superposed windings, in known manner, to be stuck together into a solid block under heat treatment.

The width and thickness of the sheetmetal strip 11, and also the number of coils in the winding 1, are determined by known methods to suit the desired use. If the specific electric resistance of the winding is to be of reduced value, a layer or coating 12' of highly conductive material is applied on the magnetizable strip 11. The thickness and dimensions of the layer can be suited to requirements and can, as shown in FIG. 2, be included along with the magnetizable strip 11 in the winding, so that each coil consists of a combination conductor. Of course, care must be taken to have adequate insulation of the coils. For this purpose, the conductive layer or the strip 12' is either applied directly on the suitably pretreated magentizable strip 11, so that intimate contact exists for the entire coiled length between the two components, and thus-obtained bimetallic conductor is insulated as a whole; or else each part-conductor may be insulated individually, so that the two strips are wound up parallel with or upon one another. The essential criteria is only that the successive conductor coils shall receive adequate insulation of their coils.

The connection wires 13 of the winding 1 are shown in FIG. 2 merely for the sake of completeness. Since this is a matter of a well-known detail, whose practical execution is determined by the circumstances of the chosen design, and is of no particular interest for the present invention, these connections are omitted in the other Figures.

Figure 3:
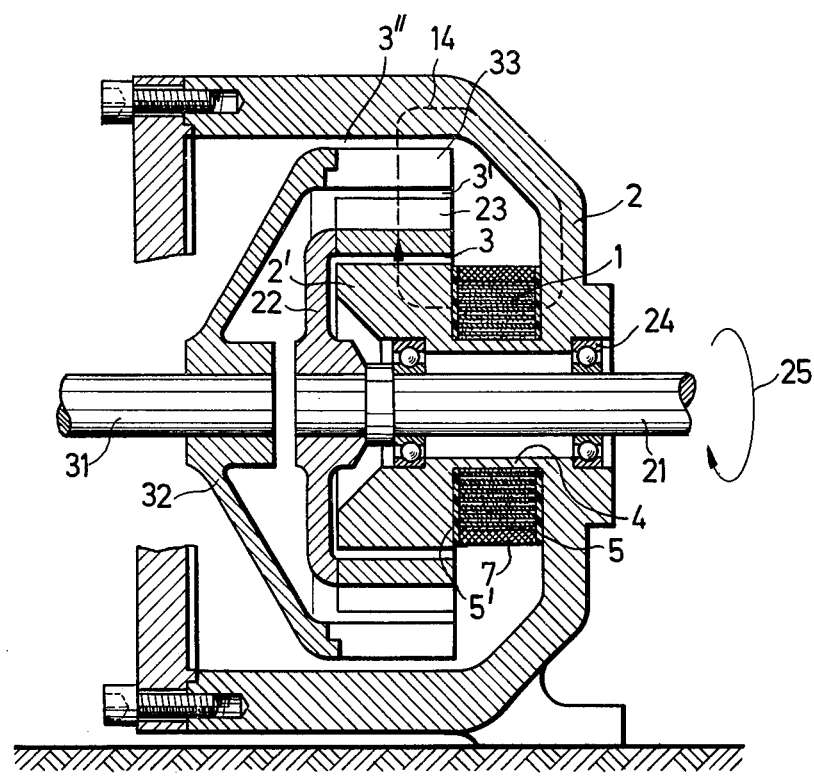
FIG. 3 illustrates a simplified sectional view through a coupler in accordance with the invention having a composite winding, one part being of magnetizable sheetmetal, with a second part wound in classic fashion using a conductor wire.

Referring to FIG. 3, a synchronous electromagnetic coupler, e.g., a clutch of a known type of construction can be constructed to use a partly magnetizable stator winding in accordance with the invention. In this case, the travel of the magnetic lines of flux 14 is improved by a pair of part-windings 1, 7, disposed in stationary fashion in the stator and machine housing, which forms the form 2, 2' and the innermost core 4 of the magnetic circuit. As shown, the housing forms part of the excitable magnetic circuit while the circuit has an air gap. The outer part-winding 7 is made of non-magnetizable highly electrically conductive material and is laid around the inner annular part-winding 1 which is made of magnetizable sheet metal. The annular main or operative air-gap is divided, by the pole-rings 23, 33 of the two rotors of the clutch fastened to the disks 22, 32, into three part-lengths 3, 3', 3''. When the drive-shaft 21, mounted rotatably in the bearings 24 concentrically within the part-windings 1, 7, turns in the direction of the arrow 25, the tooth-like poles of the primary pole-ring 23, which become magnetized through the stationary flux in the air-gap 3, 3', 3'', in their turn attract the corresponding pole 33, and thus carry along the driven shaft 31 in their rotary motion for as long as the excitation current remains switched on. The stator winding can be supplied with DC or AC.

In order to have an electrical efficiency comparable with that of a motor of the same power, the surfaces delimiting the air-gap of the stator poles 2, 2′ between which the pole-rings 22, 23, of the two rotors are rotatably situated are made as smooth rotation-surfaces. The rotor poles consist advantageously of transformer sheetmetal packets, in which the individual sheets are set in radial planes.

By a suitable adaptation of the individual above-described elements in a known manner, it is possible to make further types of couplers. For example, coupler for the asynchronous transmission of torque, or with asynchronous starting and synchronous continuous running can be made while making use of a stator winding which is at least partly magnetizable. To this end, it is sufficient to apply a conductive layer 17, or a short-circuit winding 16, 16′, similar to the familiar cage armature winding on the driven rotor.

Figure 4:
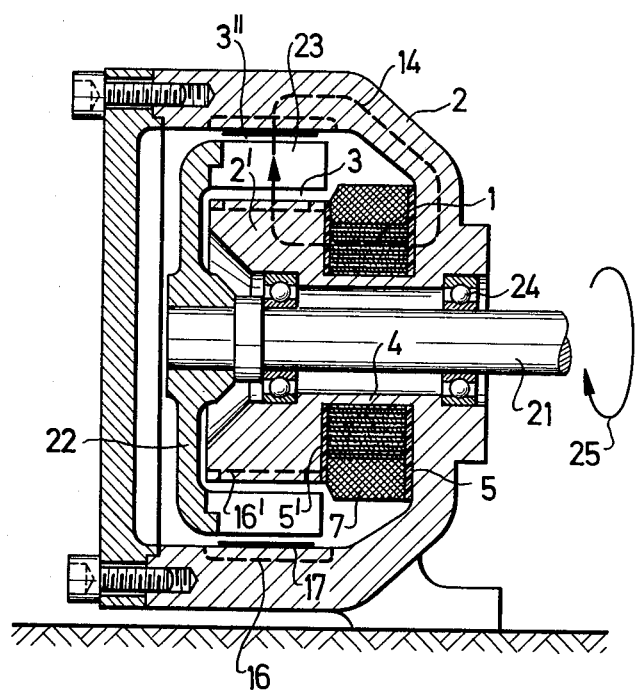
FIG. 4 illustrates a view similar to FIG. 3 of a magnetic brake with a composite winding according to the invention.

Thus, for example, and as shown in FIG. 4, the driven rotor may be replaced by the stator 2,2′, so that the driving rotor 21 to 23 becomes coupled to the stationary stator 2, 2′. The stator winding is advantageously supplied with DC. The rotor poles 23 may be made of transformer sheetmetal packets, set advantageously in radial planes.

Such a coupler can be used as an asynchronous brake when the stator has one or more short-circuit windings 16, 16′, and/or when a layer 17 of a material having low specific electric resistance is applied on the stator, in which Foucault currents can form because of the rotation of the pole-rings 23 of the rotor, and thus because of the local greatly varying field strength. With such an arrangement the braking moment varies as a function of the excitation current. If the number of stator poles equals the number of rotor poles, then in theory, the rotor can be "synchronized" with the stator. That is, so long as the torque that is to be braked does not exceed a certain value determined by the dimensioning of the coupler and the maximum allowable stator current, the rotor is held in an angular position in which the rotor poles are opposite the stator poles.

Figure 5:
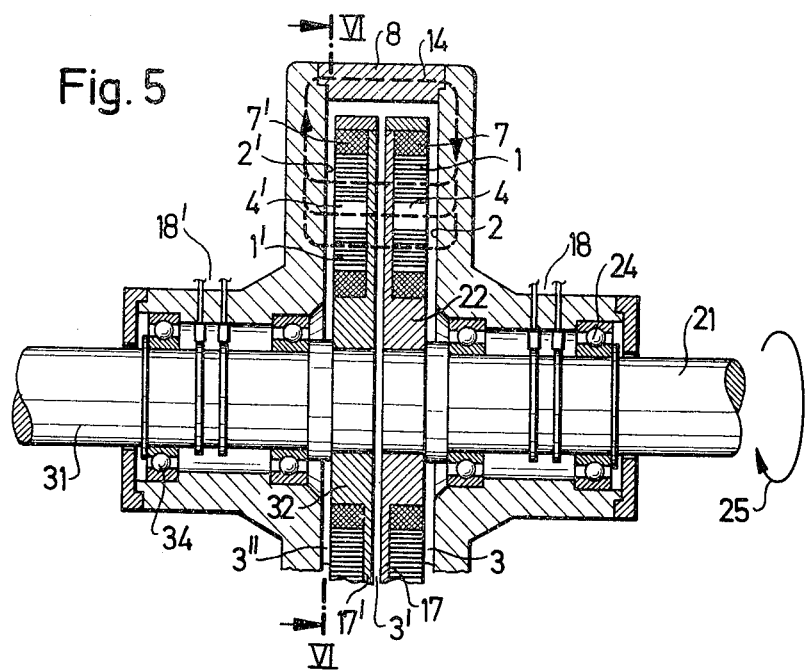
FIG. 5 illustrates a sectional view of a coupler having an excitation winding sub-divided into two series of magnetizable part windings distributed annularly over two rotors to form their poles.
Figure 6:
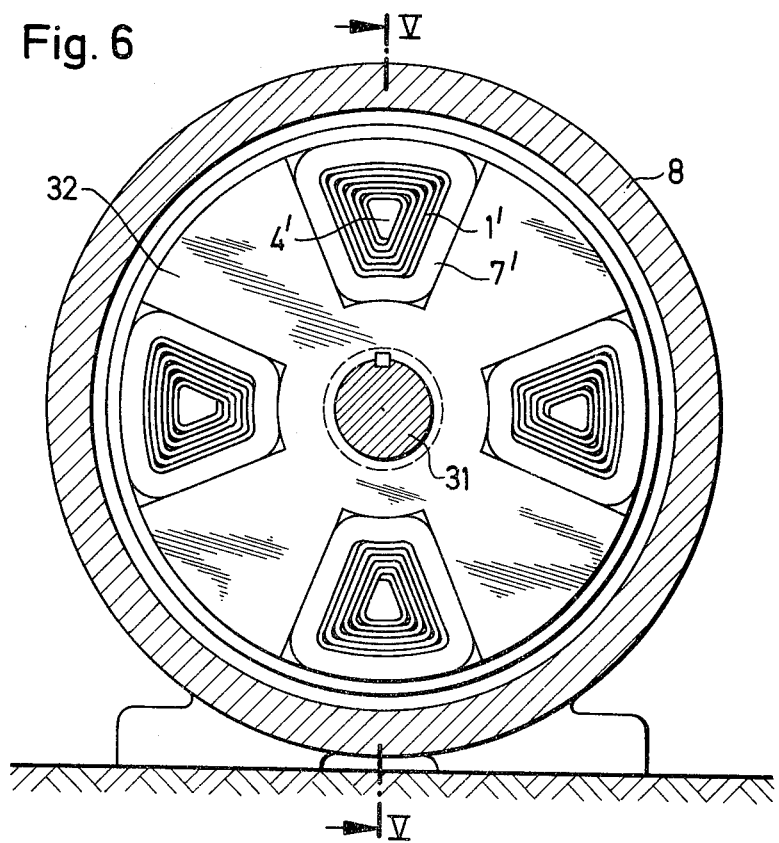
FIG. 6 illustrates a view taken on line VI—VI of FIG. 5.

The invention is not limited to the forms of construction of the coupler described in FIGS. 3 and 4, wherein a stationary magnetizable excitation or stator winding is used with a substantially cylindrical air-gap situated coaxially of the rotor shaft(s) through which magnetic flux passes radially. It is, for example, possible to make a coupler which is especially compact and can be constructed economically in largescale production, while borrowing known coupler arrangements that do not however have the advantages of the magnetizable excitation winding. As shown in FIGS. 5 and 6, an asynchronously-starting synchronizable coupler can be constructed. In this case, the coupler has two rotors 22, 32 and two bearing brackets 2,2′ which are made alike, i.e., interchangeable to simplify serial manufacture. The rotors consist essentially of nonmagnetizable round disks 22, 32, of good electrical conductivity, splined or shrunk or otherwise fastened immovably on the shafts 21, 31 which are mounted in ball-bearings 24, 34. A number, four for example, of magnetizable part-coils or windings 1, 1′ are wound the coil cores 4, 4′ and each of which is surrounded by a coil of traditional make 7, 7′, (of wire or strip that is a good conductor). These part-coils 1′1, are inserted in corresponding recesses in the rotor disks 22, 32 and are distributed in annular fashion over the periphery of the rotor disk. The individual part-windings are wound and connected in known manner so that they all become magnetized similarly, through the intermediary of connection terminals 18, 18′, and slip-rings, by the excitation current, preferably DC. The magnetic flux induced in part-windings 1, 1′ passes axially through the air-gap 3, 3′, 3″, and closes the magnetic circuit 14 shown dotted over the bearing brackets 2, 2′ acting as stator poles and the stator ring 8 of the coupler housing. At the side turned toward the other rotor, all part-coils are covered by a thin layer or metal sheet 17, 17′, of non-magnetizable material which is a good electric conductor. Alternatively, a thin disk-like metal sheet of the same diameter as the rotor disks 22, 32, however without cut-outs for the part-coils, may be used. These coverings, and the parts of the rotor disks 22, 32, situated between the two coils and not cut out may be used for asynchronous coupling between the rotors. If the driving rotor 22 turns at constant speed, then the driven rotor 32 will start asynchronously at the switch-on of the excitation current. As soon as the rotary speed approximates that of the driving rotor 22, the two rotors, via the attracting force acting between their poles, are held in a position relative to one another in which the poles are opposite. The coupler then continues running synchronously so long as the part-coils of the excitation winding have a sufficiently strong excitation current flowing through them.

What is claimed is:
1. An electromagnetic coupler comprising
    a housing defining part of an excitable magnetic circuit having an air-gap therein and a solid magnetizable core of said circuit;
    a drive shaft rotatably mounted in said housing;
    a rotor fixedly mounted on said shaft;
    a single ring of poles mounted on said rotor and disposed in said air-gap;
    a driven shaft spaced from said first shaft;
    a second rotor fixedly mounted on said driven shaft;
    a single ring of poles mounted on said second rotor and disposed about said first ring of poles;
    a substantially annular excitation winding disposed concentrically about said drive shaft and said core, said winding having a plurality of coils disposed in insulated manner with respect to each other, said coils being of a magnetically highly permeable strip material to form at least a part of said magnetizable core of said magnetic circuit with said winding being magnetizable in a longitudinal direction thereof; and
    a non-magnetizable part-winding concentrically about said excitation winding.
2. An electromagnetic coupler comprising
    a housing defining part of an excitable magnetic circuit having an air-gap therein;
    at least one shaft rotatably mounted in said housing;
    a rotor fixedly mounted on said shaft; and
    a plurality of substantially annular excitation windings distributed annularly about said rotor to form at least a part of a ring of poles thereof in said air gap, each said winding being divided into two part-windings with the inner windings having coils disposed in insulated manner with respect to each other, said coils being of a magnetically highly permeable strip material to form at least a part of a magnetizable core of said magnetic circuit with each said winding being magnetizable in a longitudinal direction thereof.

3. An electromagnetic coupler comprising
a housing defining part of an excitable magnetic circuit having an air-gap therein;
a shaft rotatably mounted in said housing;
a rotor fixedly mounted on said shaft;
a ring of poles mounted on said rotor and disposed in said air-gap; and
a substantially annular excitation winding disposed concentrically about said shaft, said winding having an inner part-winding and an outer part-winding surrounding said inner part-winding, said outer part winding being made of non-magnetizable highly-conductive material and said inner-part winding being of a magnetically highly permeable strip material to form at least a part of a magnetizable core of said magnetic circuit with said winding being magnetizable in a longitudinal direction thereof.

4. An electromagnetic coupler comprising
a housing defining part of an excitable magnetic circuit having an air-gap therein;
a shaft rotatably mounted in said housing;
a rotor fixedly mounted on said shaft;
a ring of poles mounted on said rotor and disposed in said air-gap;
a substantially annular excitation winding disposed concentrically about said shaft, said winding having a plurality of coils disposed in insulated manner with respect to each other, said coils being of a magnetically highly permeable strip material to form at least a part of a magnetizable core of said magnetic circuit with said winding being magnetizable in a longitudinal direction thereof; and
at least one short-circuit winding on each pole-shoe of a stator formed by said housing.

5. An electromagnetic coupler comprising
a housing defining a stator part of an excitable magnetic circuit having an air-gap therein and pole shoes;
a shaft rotatably mounted in said housing;
a rotor fixedly mounted on said shaft;
a ring of poles mounted on said rotor and disposed in said air-gap;
a substantially annular excitation winding disposed concentrically about said shaft, said winding having a plurality of coils disposed in insulated manner with respect to each other, said coils being of a magnetically highly permeable strip material to form at least a part of a magnetizable core of said magnetic circuit with said winding being magnetizable in a longitudinal direction thereof;
a driven shaft coaxially spaced from said first shaft;
a second rotor fixedly mounted on said driven shaft; and
a ring of poles mounted on said second rotor and disposed in said air-gap to divide said air-gap into a three part air-gap with said first ring of poles, and wherein said pole-shoes of said stator formed by said housing have smooth surfaces opposite said air-gap.

6. An electromagnetic coupler comprising
a housing defining part of an excitable magnetic circuit having an air-gap therein;
a shaft rotatably mounted in said housing;
a rotor fixedly mounted on said shaft;
a ring of poles mounted on said rotor and disposed in said air-gap;
a substantially annular excitation winding disposed concentrically about said shaft, said winding having a plurality of coils disposed in insulated manner with respect to each other, said coils being of a magnetically highly permeable strip material to form at least a part of a magnetizable core of said magnetic circuit with said winding being magnetizable in a longitudinal direction thereof; and
a solid piece of magnetically permeable material forming a part of said core.

7. An electromagnetic coupler comprising
a housing defining part of an excitable magnetic circuit having an air-gap therein;
a shaft rotatably mounted in said housing;
a rotor fixedly mounted on said shaft;
a ring of poles mounted on said rotor and disposed in said air-gap;
at least one short-circuit winding mounted in said housing about said ring of poles to define stator poles; and
a substantially annular excitation winding disposed concentrically about said shaft, said winding having a plurality of coils disposed in insulated manner with respect to each other, said coils being of a magnetically highly permeable strip material to form at least a part of a magnetizable core of said magnetic circuit with said winding being magnetizable in a longitudinal direction thereof.

* * * * *